US011148795B1

(12) United States Patent
Bobba et al.

(10) Patent No.: US 11,148,795 B1
(45) Date of Patent: Oct. 19, 2021

(54) RADIAL AIRFOIL AND LIFT DISC

(71) Applicants: Choudary Ramakrishna Bobba, Palm City, FL (US); Rani Prameela Bobba, Palm City, FL (US)

(72) Inventors: Choudary Ramakrishna Bobba, Palm City, FL (US); Rani Prameela Bobba, Palm City, FL (US)

(*) Notice: Subject to any disclaimer, the term of this patent is extended or adjusted under 35 U.S.C. 154(b) by 0 days.

(21) Appl. No.: 17/366,694

(22) Filed: Jul. 2, 2021

(51) Int. Cl.
*B64C 27/473* (2006.01)
*B64C 29/00* (2006.01)
*B64D 27/24* (2006.01)
*B64C 39/00* (2006.01)
*B64C 27/82* (2006.01)

(52) U.S. Cl.
CPC .......... *B64C 27/473* (2013.01); *B64C 29/00* (2013.01); *B64D 27/24* (2013.01); *B64C 39/001* (2013.01); *B64C 2027/8263* (2013.01)

(58) Field of Classification Search
CPC .......... B64C 27/473; B64C 2027/8263; B64C 29/0091; B64C 2201/104
USPC ........................................................ 244/17.21
See application file for complete search history.

(56) References Cited

U.S. PATENT DOCUMENTS

| | | | | |
|---|---|---|---|---|
| 2,876,964 A * | 3/1959 | Streib | .................. | B64C 39/064 244/12.2 |
| 2,922,277 A * | 1/1960 | Bertin | ...................... | F02K 1/36 244/12.2 |
| 4,506,849 A * | 3/1985 | Lemont | .................... | B64C 27/20 244/17.11 |
| 4,585,391 A * | 4/1986 | Vuillet | ..................... | B64C 27/82 415/121.3 |
| 5,292,088 A * | 3/1994 | Lemont | .................... | B63H 5/14 244/65 |
| 5,393,197 A * | 2/1995 | Lemont | .................... | F04D 25/12 415/211.1 |
| 6,086,016 A * | 7/2000 | Meek | ...................... | B64C 27/02 244/17.11 |
| 6,732,972 B2 * | 5/2004 | Malvestuto, Jr. | ........ | B64C 23/08 244/12.3 |
| 7,802,755 B2 * | 9/2010 | Poltorak | ................. | B64C 27/20 244/17.27 |
| 8,690,096 B2 * | 4/2014 | Alvarez | ..................... | B64C 3/10 244/6 |
| 9,067,676 B1 * | 6/2015 | Hethcock | ................ | B64C 27/82 |
| 11,001,378 B2 * | 5/2021 | Evulet | .................... | B64D 27/16 |

(Continued)

FOREIGN PATENT DOCUMENTS

WO WO-0224526 A1 * 3/2002 ........... B64C 27/473

*Primary Examiner* — Christopher P Ellis
(74) *Attorney, Agent, or Firm* — Kintner IP LLC; Mary Frances Ludwig

(57) ABSTRACT

A radial airfoil is an airfoil having a tip profile and a hub profile of an airfoil that were set apart at different angles of attack and joined by lofted top and bottom surfaces. The top surface is usually a convex surface, whereas the bottom surface is a slightly convex to substantially straight flat surface. The lift disc is a device including multiple radial airfoils that generate additional lift from the spent air from a VTOL (Vertical Take-off and Landing) machine, like a drone or helicopter. The lift disc can be used in several ways to assist the VTOL machines to generate lift. It can be used in a static mode where the lift disc is a non-moving element of the VTOL system. In a dynamic mode, the lift disc replaces the propeller and acts as a propeller to generate lift.

15 Claims, 9 Drawing Sheets

(56) References Cited

U.S. PATENT DOCUMENTS

| | | | | |
|---|---|---|---|---|
| 2009/0212166 A1* | 8/2009 | Garreau | ............ | B64C 29/0033 244/7 R |
| 2017/0057621 A1* | 3/2017 | Evulet | .................... | F02K 1/002 |
| 2018/0273194 A1* | 9/2018 | Edgar | ................... | B64D 27/24 |

* cited by examiner

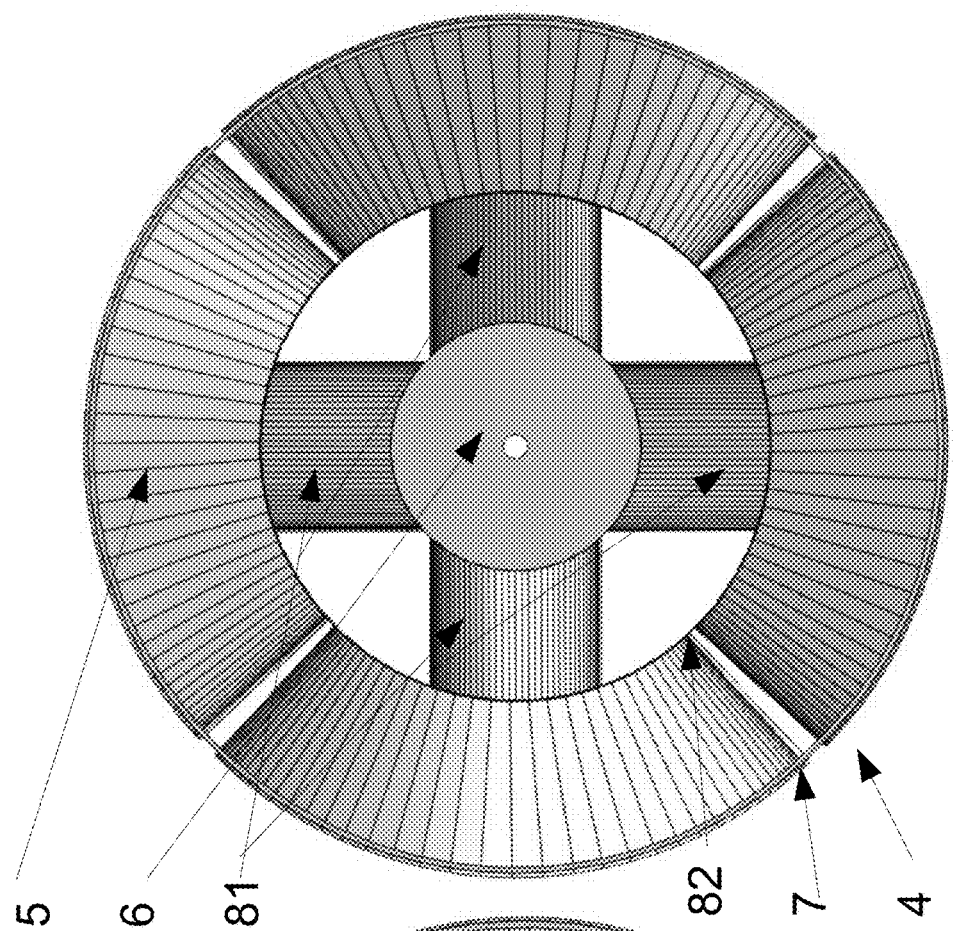
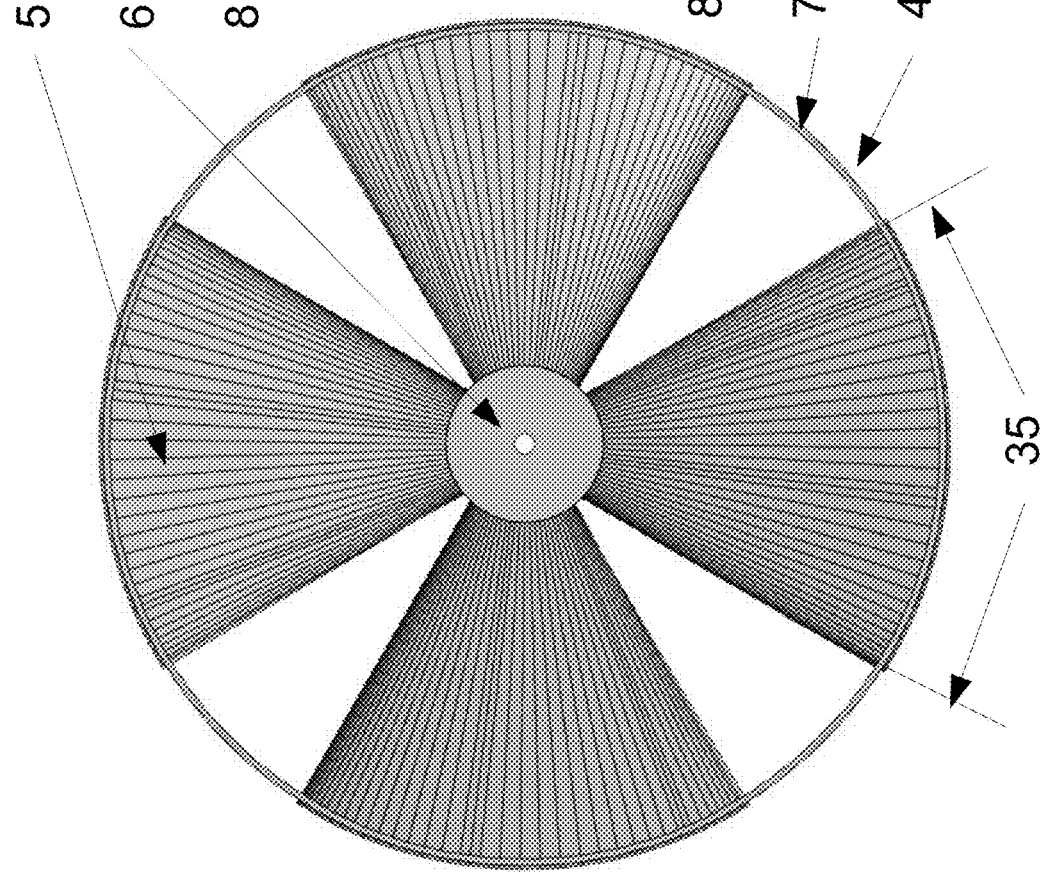
Figure 8B
Figure 8A

RADIAL AIRFOIL AND LIFT DISC

BACKGROUND

From time immemorial humans were curious as how the birds fly. Many a folks including Leonardo Da Vinci were interested in flying and experimented with various devices to fly. Their efforts were not successful until the successful efforts of Wright Brothers. Wright brothers efforts led to the advent of aerodynamics as we know of it to day. The application of aerodynamics led to the development of airplanes in many different configurations and applications. A significant element for flying is the discovery and application of 'airfoils' and the effect of air flow around them. Airfoils in various forms led to the development of various wing forms that produce lift; which is a vertical force generated by the flow of air around an airfoil or a wing-like surface to support airplane bodies in air.

However, there is not an airfoil that can be used with circular motion. Such a circular motion requires that the leading edge of the airfoil is always normal to the flow direction at all radial positions in motion. Such an airfoil would be of great help to improve the performance of the VTOL (Vertical Take-Off and Landing) machines.

BRIEF SUMMARY OF THE EMBODIMENTS

Embodiments disclosed herein are directed to a radial airfoil with its multitude of applications; presented here is a breakthrough component which is entirely different in form and function than any of the ones that are in vogue at this time. The associated lift disc with multiple radial airfoils can be used as a static component or a dynamic component that can assist significantly in improving the lift characteristics of the propulsion system used in VTOL machines.

It has occurred to the inventor, what if we could harness the enormous energy in a tornado and convert it to useful energy that may help improve our life on earth? Of course, it is wishful thinking at the present time. Someday another apple might fall on a budding Newton to discover such a phenomena. At the present time, there is an opportunity to apply this thought to cultivate the remaining energy in the tornado-like flow from a helicopter or drone propeller after it generates sufficient lift to keep them in air.

BRIEF DESCRIPTION OF THE DRAWINGS

FIG. 8A is top view of one embodiment of a lift disc; and FIG. 8B is a top view of another embodiment of a lift disc.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION

Figure 1:
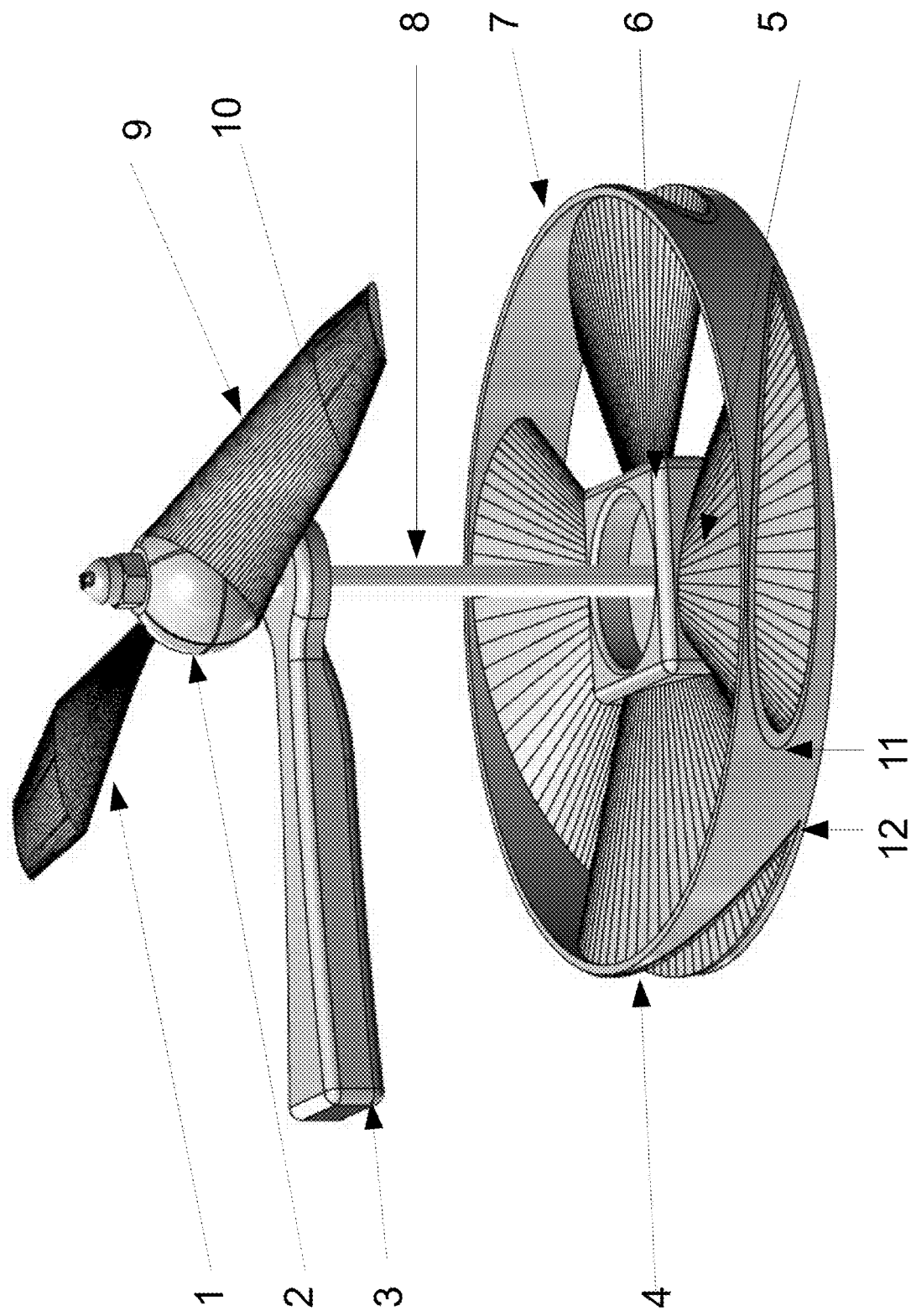
FIG. 1 is a perspective view of an embodiment of a VTOL vehicle propulsion system.

FIG. 1 depicts a first embodiment that is applicable to drones or helicopters which are referred to herein as VTOL (Vertical TakeOff and Landing) machines. FIG. 1 shows a propeller 1 attached to the motor 2 that is held in position by VTOL arm 3 connected to a VTOL machine (not shown here). When the VTOL machine is in operation, the propeller 1 rotates at high speed and pushes the air downwards. This air develops lift, an upward force that raises the VTOL machine and keeps it suspended in the air, by virtue of the propeller configuration to assist the VTOL machine. It is imperative that this air is not only traveling downwards from the propeller 1 but also rotating in the forward direction indicated by the propeller leading edge 9 of the propeller 1. In other words, if the propeller 1 is rotating in clockwise direction, the resultant air from the propeller action also rotates in the clockwise direction and vice versa. After developing the necessary lift, the air rotates down ward and is referred to here as the spent air. This spent air, once it leaves the neighborhood of the propeller 1, still has a sufficient amount of energy to do additional useful work to assist the VTOL machine.

As used in this application, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein, the terms "generally" or "substantially" when referring to a shape mean that an ordinary observer will perceive that an object has said shape even if there are minor variations from said shape. As used herein referring to a numerical value, the terms "about" or "substantially" refer to a range of values within plus or minus 10% of the specified number.

A lift disc 4, shown in FIG. 1, includes multiple radial airfoils 5 held in place by a hub 6, and a tip ring 7 which in turn is held in place by a shaft 8 connected directly to motor 2. The rotating spent air from the propeller engulfs the radial airfoils 5 while traversing in a circular manner and can generate additional lift by virtue of the surface geometry of these airfoils. Note here the propeller leading edge 9 of the propeller 1 is pointed in the anti-clockwise direction while the leading edge of the radial airfoil 11 is pointed in clockwise direction. This arrangement facilitates the rotating spent air to engulf the radial airfoil 5 and modifies the surface pressure distribution on the radial airfoil 5 that helps generate additional lift.

Figure 2:
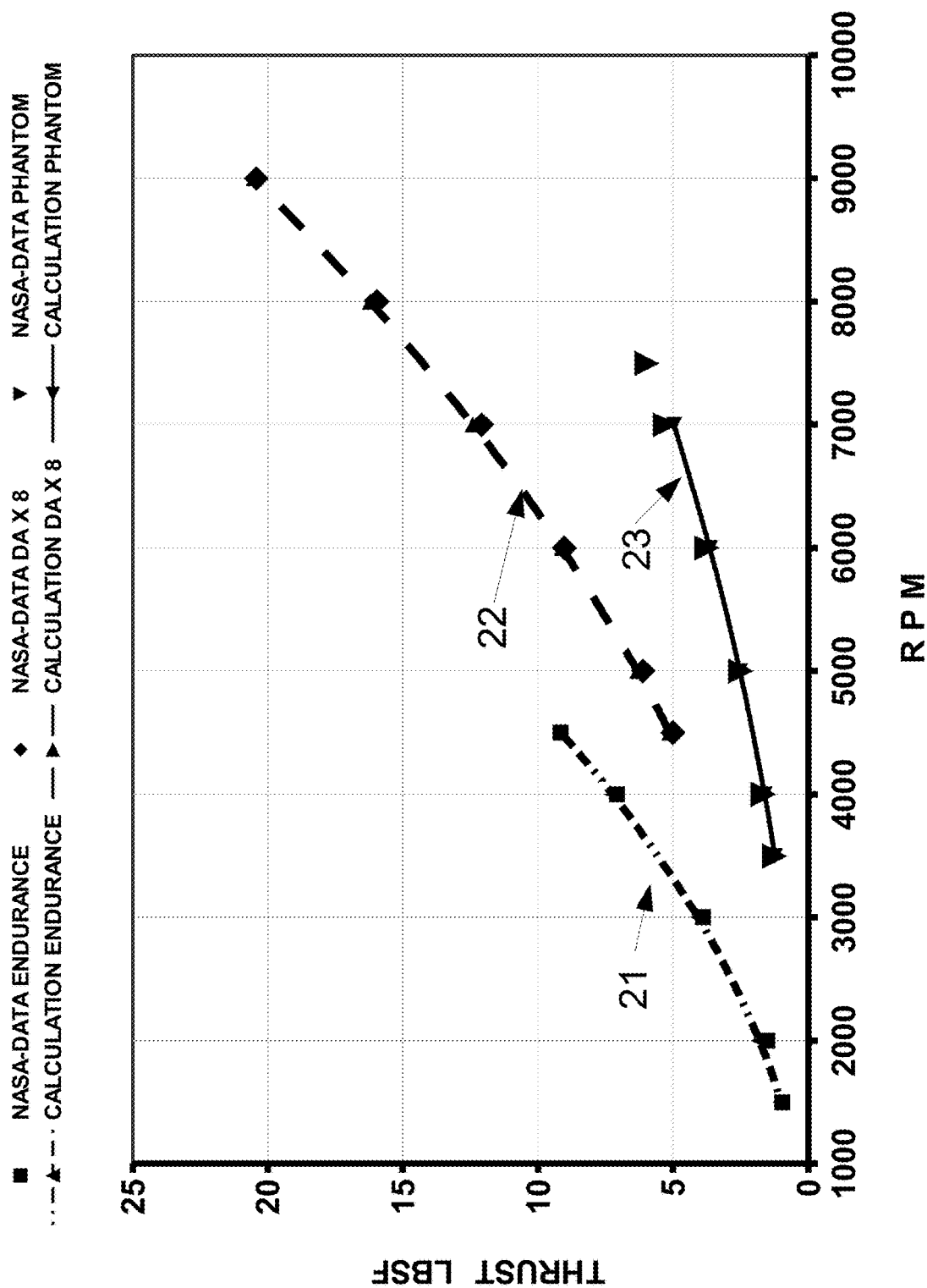
FIG. 2 is a graph comparing calculated thrust with NASA measurements.

While the lift disc may function as a static component to generate additional lift, it also adds weight to the system. That additional thrust generated by the lift disc needs to be sufficiently more than the weight of the lift disc which the system needs to support in the air. In other words, the thrust to weight ratio (i.e., thrust from a device/weight of the device including any additional pay loads) of the lift disc 4 must be greater than 1. During the design phase of a thrust producing device, it is very helpful and necessary to estimate thrust to weight ratio from the device at the operating conditions and make sure that such a ratio meets the design intent. Usually a minimum thrust to weight ratio of 2 is desired. To address this issue, the existing methodology was used to estimate thrust from commercially available drone machines at known operating conditions and compared with the existing thrust measurements from the same. A search for such existing data revealed that NASA has measured and published (Reference-1) thrust data for known drones. FIG. 2 shows the variation of the thrust; in pounds force (LBSF) versus the rotational speed of the propellers in revolutions per minute (RPM).

Specifically, FIG. 2 compares the measured data with the calculated thrust; using the existing methodology; for the same configurations. The NASA data is presented in different solid symbols for three data sets, whereas the calculations are presented in different solid lines for the three data sets. Curve 21 compares the calculated thrust with the measurement (represented by squares) for the Drone called Endurance. Curve 22 shows the comparisons of NASA measured thrust data (represented by diamonds) with the calculated thrust of this report for a drone referred to as DA X 8. Curve 23 presents similar results for a third Drone named Phantom-3 (where measurements are represented by triangles). As can be seen, the agreement between the calculated thrust and NASA measurements is very good. This agreement of calculations with known data indicates that the performance of the radial airfoils and the lift disc, although they are unique and different in form and function than any of the existing devices, can be evaluated with confidence.

The invention presented here, the lift disc with radial airfoils, is a component that can act as a static component or a dynamic element that can assist in improving the lift characteristics of the propulsion system used in drones and the large scale machines like helicopters. The term static as used herein refers to the condition where a component of a system stays still and does not move relative to the system, whereas the term dynamic is meant to represent a rotating or moving part of a system like the VTOL referred to here.

Figure 3B:
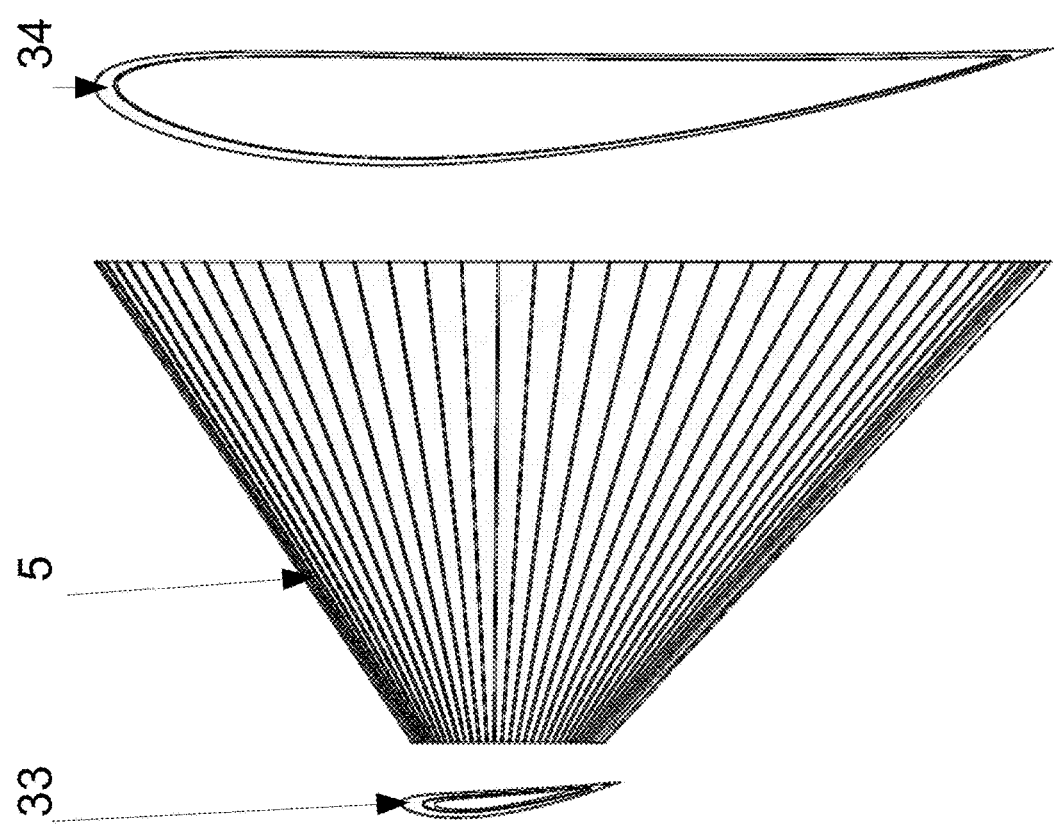
FIG. 3b shows cross-sectional profiles thereof.
Figure 3A:
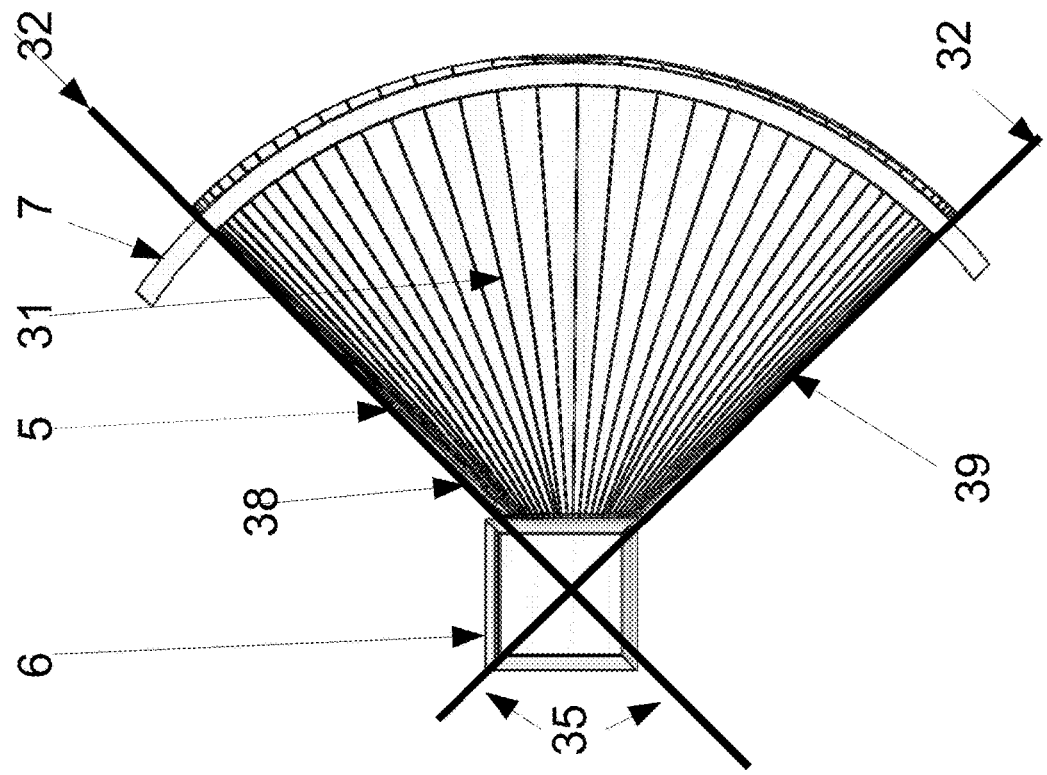
FIG. 3a is top view of an embodiment of a radial airfoil.

Typical aircraft embodiments employ airfoil geometry for lifting surfaces. The wings of an aircraft and the rotating blades of a helicopter are examples of the lifting surfaces. Typically the wing and helicopter blade geometries are straight extrusions of the airfoil section and are attached to the body of the aircraft to generate lift. Such configurations are not of much help to use in a flow field that moves in circular fashion. FIG. 3 shows the details of the development of the radial airfoil 5 that are used in the lift disc 4 for circular flows as shown in FIG. 1. As indicated in the figure, it requires two clearly defined airfoil profiles; one at tip and another adjacent the hub. FIG. 3a shows an embodiment of the radial airfoil 5. FIG. 3b shows an end view of a distal cross-section or tip profile 34 of radial airfoil 5, and a proximal cross-section or hub profile 33 at the other end of the radial airfoil 5. To develop the radial airfoil 5, a cross-section or a tip profile 34 of radial airfoil 5 at the larger end was used. The hub profile 33 was chosen as a scaled down replica of the tip profile 34. It is not necessary that the hub profile 33 be a replica of tip profile 34. These two profiles can be independent and different from each other depending on the application. These two profiles, which are placed in the same plane in a sector of a circular element enclosed by two radial lines 38 at leading edge and 39 at trailing edge and a tip ring 7, and a hub 6, and are set apart by a distance defined by the design requirement of the application of the lift disc 4. At this stage the tip profile 34 and the hub profile 33 are parallel to each other and are on a defined axis, enclosed in a circular sector, contained in sector angle 35, with zero angle of attack. The operating requirements of the design defines the angle of attack of these two profiles at hub and at tip respectively. With this information at hand, these two profiles are then pitched up or down as defined by the design to set them at the desired angles of attack. The profiles are then joined by lofting from one to the other. The result of this step yields the radial airfoil 5 shown in FIG. 3a. This geometry of the radial airfoil 5 is then trimmed by the tip ring 7 to fit into the circular pattern of the lift disc 4.

Figure 4:
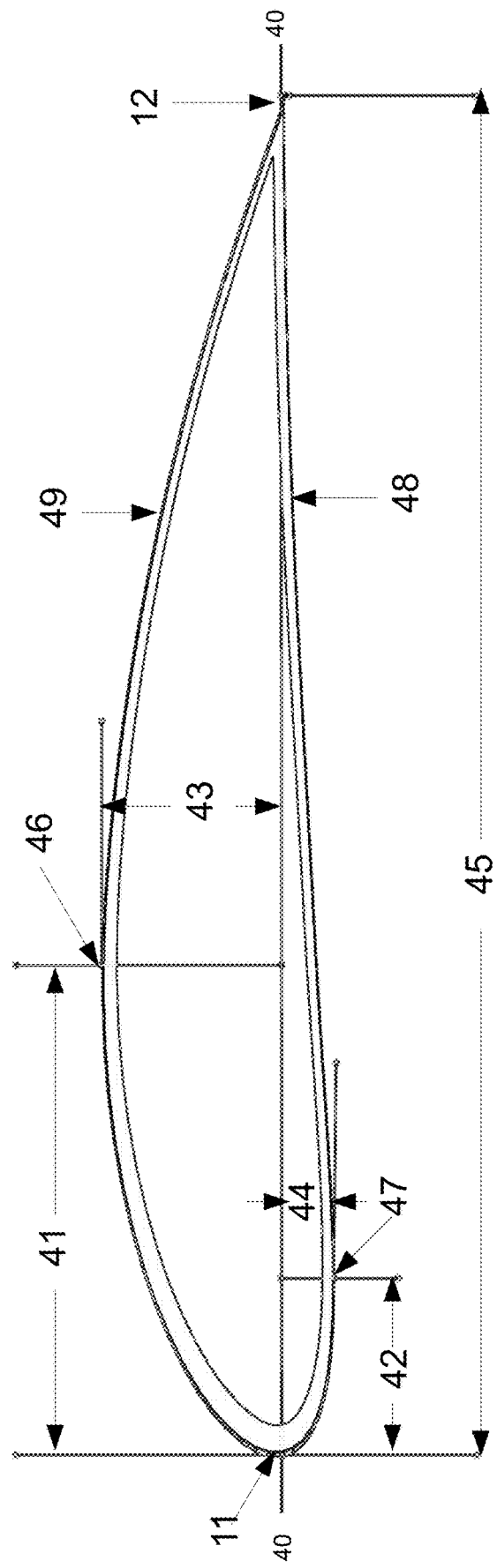
FIG. 4 illustrates the hub and tip profiles of a radial airfoil.

The details of an airfoil that represents the tip profile 34 and the hub profile 33 are shown in FIG. 4. For reference purposes this airfoil shall be referred to as BAF-01 (Basic Airfoil-01). It is an airfoil with a convex top surface 49 and a slightly concave to straight bottom surface 48. The leading edge is represented by 11 and the trailing edge of the airfoil is represented by 12. The line 40-40 is referred to as the chord line of the airfoil. The distance between the leading edge 11 and that of trailing edge 12 is called chord length 45. All other dimensions of the airfoil are represented by a percentage of the chord length 45 of the airfoil. For convention purposes the leading edge is located at zero (0.0) percentage length of the chord length 45. The top surface 49 details shall be defined first, and the details of the bottom surface 48 shall follow. The starting point for this first section of the top surface is the leading edge 11 and ends at the maximum thickness point 46 located at a distance 41 of 30 to 35% of the chord length 45 with a zero slope on its top surface. The maximum thickness point 46 of the top surface 49 is located at a height 43 of 10 to 12% of the chord length from the chord line 40-40. The second part of the top surface, from the maximum thickness point 46 to trailing edge 12, starts from the maximum thickness point 46 and ends at the trailing edge point 12. The starting point for the bottom surface is the leading edge 11, exactly the same leading edge 11 point where the top surface started, and ends at the trailing edge 12; exactly where the top surface 49 ended forming a completely closed profile.

The bottom surface is also divided into two parts. The first part of the bottom surface starts at exactly the leading edge 11 and ends at the maximum thickness point 47 with a zero degree slope on its bottom surface. The maximum thickness 44 of the bottom surface of the airfoil is located at a distance of 10 to 12% of chord length from the leading edge 11. The maximum thickness point 47 of the bottom surface is at a height of about 2.5% to 3% of the chord length from the chord line 40-40. The second part of the bottom surface, which is mostly a straight line, starts at the maximum thickness point 47 and ends at the trailing edge 12, where the top surface ended. It is important to recognize that the top surface and the bottom surface are defined in such a manner to avoid separation of flow from them. Although this BAF-01 is used in this application, it must be recognized that any known airfoil geometry can be used to develop the respective radial airfoil as presented here.

Figure 5:
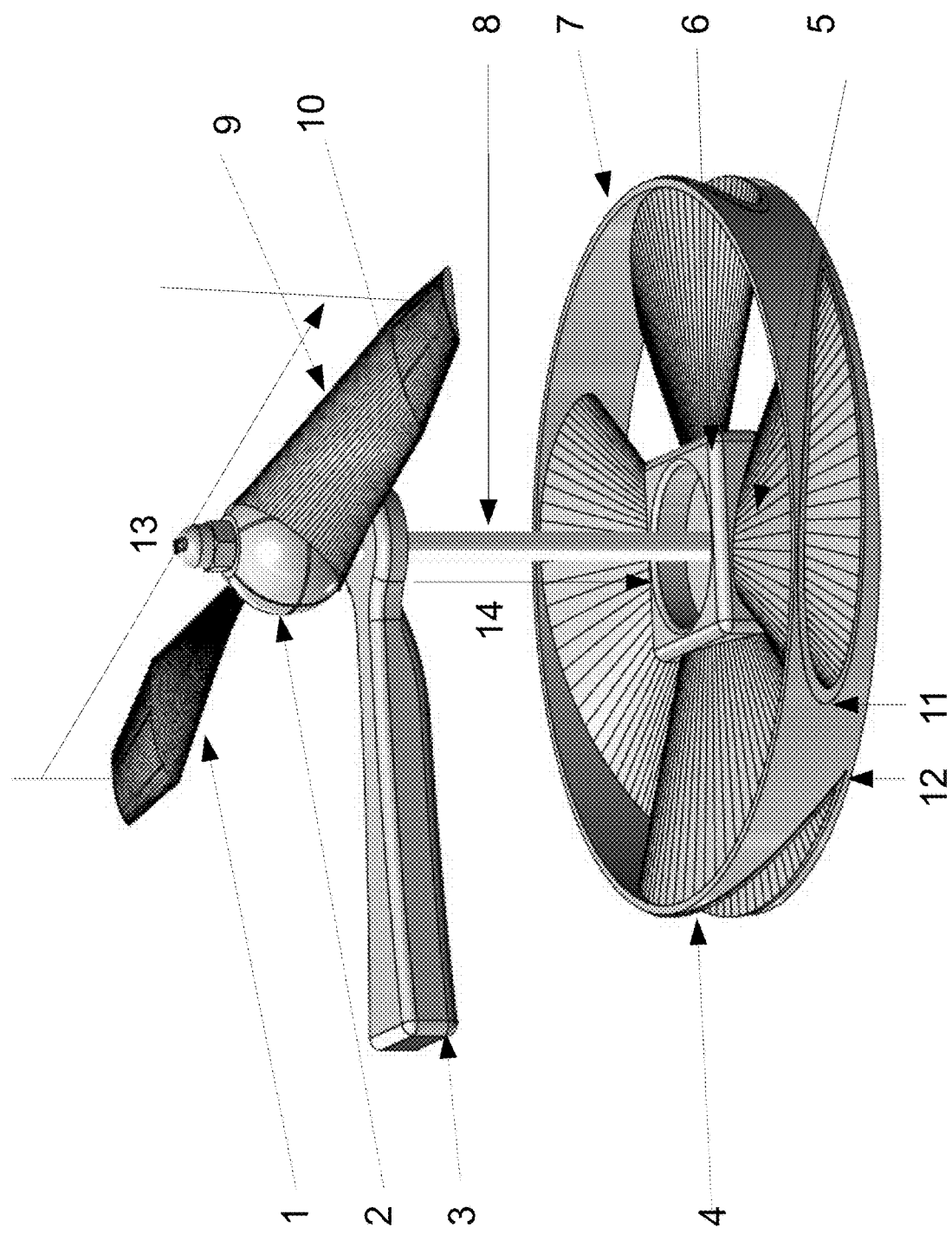
FIG. 5 is a perspective view of an embodiment of a lift disc in static mode.

FIG. 5 shows a lift disc 4, an application of the radial airfoils, that includes multiple radial airfoils 5, a hub 6, and a tip ring 7 that is being used in a static mode of operation of a VTOL machine. As shown in the figure, the radial airfoils 5 are connected to hub 6 at the smaller inner end while the large outer end of the radial airfoil 5 is connected to the tip ring 7 forming an assembled component lift disc 4. FIG. 5 also shows a propeller 1 attached to the motor 2 that is held in position by VTOL arm 3 connected to a VTOL machine (not shown here). The lift disc 4 is held in position by a shaft 8 that is connected to the bottom of the propeller motor and does not rotate. The lift disc 4 is aligned in such a way that the center lines of propeller and the lift disc are coincident. The rotational direction of the propeller is opposite to the forward direction indicated by the leading edges of the radial airfoils 5 of lift disc 4 so that the spent air from the propeller 1 passes over and engulfs the radial airfoils 5, thereby producing additional lift. The length of the propeller 13 is referred to as "Propl" 13. The shaft 8 height 14 indicates the position where the lift disc 4 may be located for additional gains in thrust due to its presence. This distance 14 may best be specified as a percentage of Propl 13. The shorter the height 14 without physical interference of the two components namely the propeller 1 and the lift disc 4, the better the gains of lift due to the lift disc 4. An optimal location of height 14 of lift disc 4, from the VTOL arm 3, of 10% to 20% of Propl is desirable.

Figure 6:
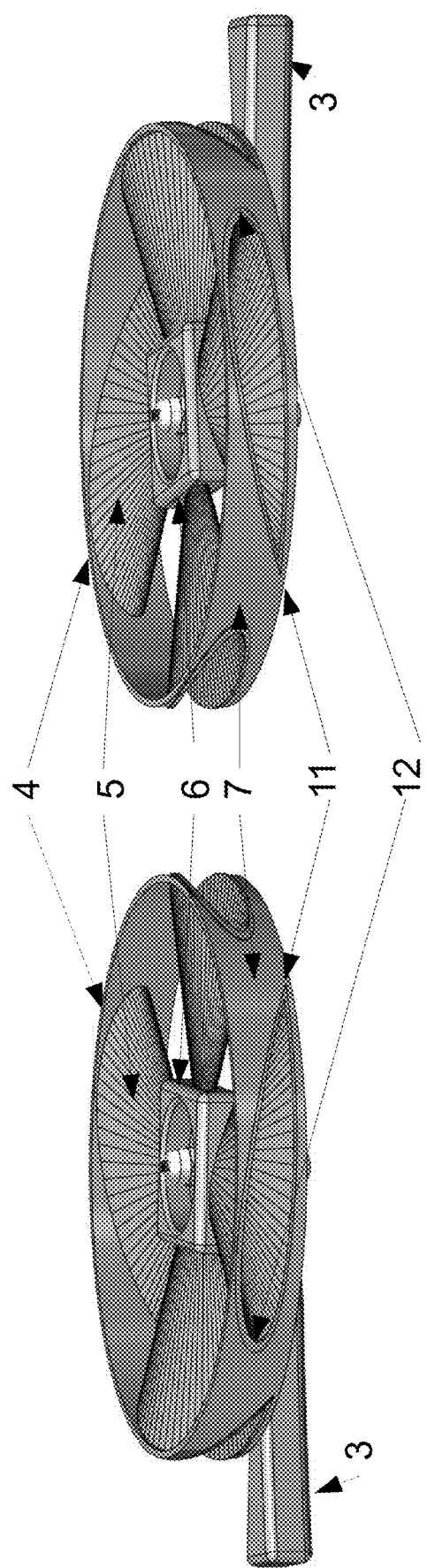
FIG. 6 is a perspective view of an embodiment of a lift disc in dynamic mode.

FIG. 6 shows another application of the lift disc 4 installed in a dynamic mode configuration. In this mode, the lift disc replaces the propeller 1 and acts as a propeller. Lift disc 4 is attached to the motor 2 which in turn is connected to the VTOL machine by the arm 3. As in the descriptions above the radial airfoils 5 are held in place by hub 6 and the tip ring 7. The figure shows two lift discs 4 in adjacent positions, such as in a quad4 VTOL system, reflecting their opposite rotational directions.

Figure 7:
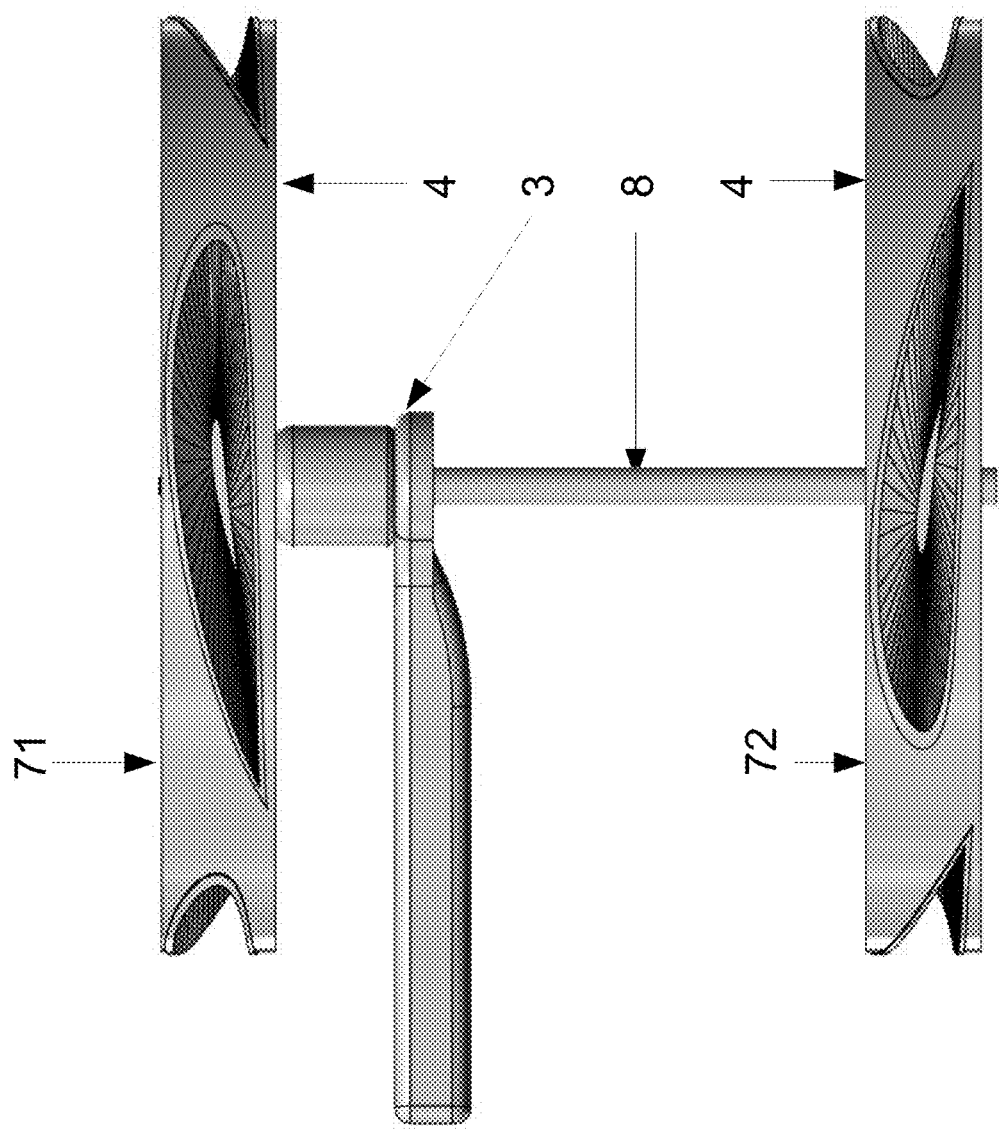
FIG. 7 is a perspective view of an embodiment of a lift disc in a combined mode.

FIG. 7 shows a combined mode of operation of the lift disc 4. In this mode two mirror images, 71, 72, of lift discs 4 can be seen where the radial airfoils are placed in opposite directions and having opposite rotational directions. The upper lift disc 4 is installed in place of the propeller 1 of the VTOL machine. The lower lift disc serves as a static component whereas the upper one acts as a propeller providing power to the VTOL machine. The static component, the bottom lift disc 4, and the dynamic component, the top lift disc 4, are on the same center line, so that the air flow of the spent air from the top propelling lift disc 4 engulfs the radial airfoils 5 of the static lift disc 4 on the bottom. The advantage here is that with no additional power input, the system generates additional lift in excess of the weights imposed by the static lift disc.

To generate higher lift, the lift discs 4 are subjected to very high rotational velocities. The centrifugal forces developed at such high speeds may cause a failure of the lift discs. To prevent such failures from occurring, a concentric lift disc may be adopted. FIG. 8A shows the lift disc with larger radial airfoils 5 connected to hub at one end and a tip ring 7 at the other end. FIG. 8B shows a concentric lift disc with a concentric radial airfoil 5C. The hub 6 is attached to a concentric ring 82 (concentric to tip ring 7), which in turn is connected to a multiple of support beams 81. The concentric radial airfoil 5C is attached to the concentric ring 82 at its inner radius, while the other end of the concentric airfoil is connected to the outer tip ring 7.

In the design of lift discs and the placement of the radial airfoils in them, two rules defined as rotor solidity and blade solidity were considered. The rotor solidity is defined as percentage of the area covered by the radial airfoil surface to the total surface are of the lift disc. The total area of the radial disc is calculated as (PI*R*R), where R is the maximum radius 7 of the lift disc 4.

The space occupied by the N (N is the number of radial airfoils in a given lift disc) radial airfoils is (N*THETA*R*R) where THETA (in radians) is the enclosed sector angle 35 containing the radial airfoil. The rotor solidity is then reduced to (N*THETA)/(2*PI) where PI is approximately 3.1416 radians. In a similar manner the blade solidity defined as percentage of length occupied by the chord length 45 of the radial airfoils to the periphery of the lift disc. This blade solidity reduces to N*Sin(THETA/2)/(PI). These ratios are maintained within a range of 0.30<=Solidity<=0.90 in this application, where Solidity may be blade solidity or rotor solidity.

Figure 9:
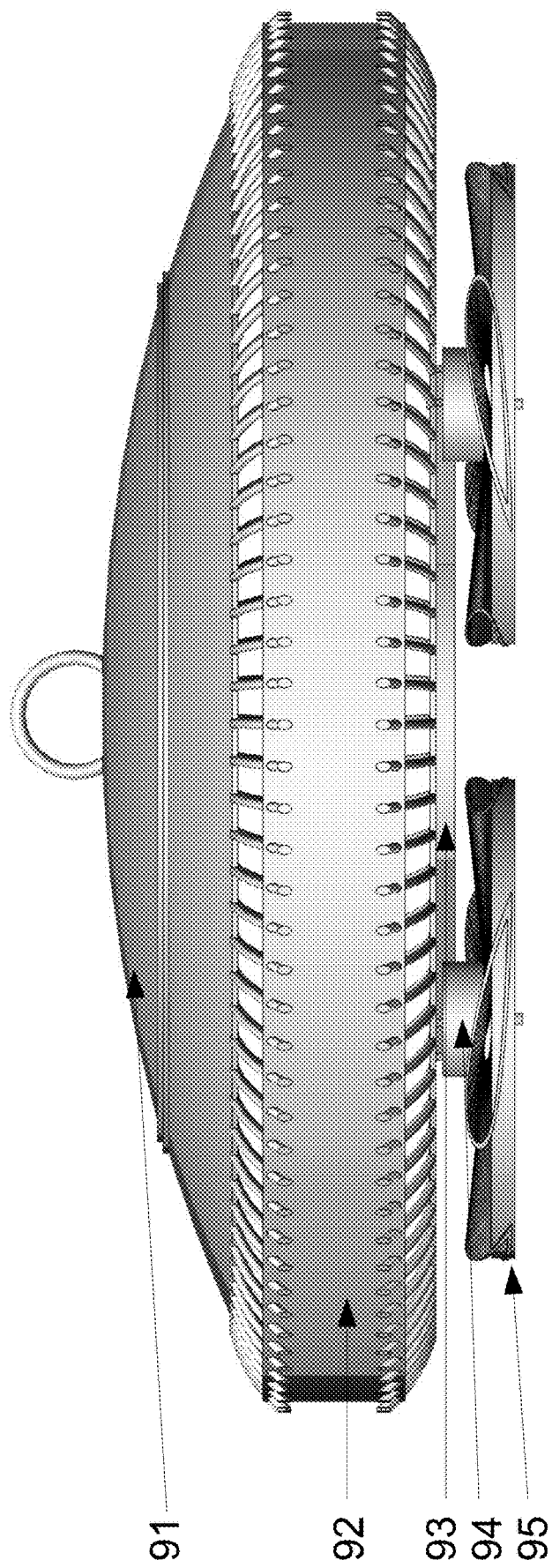
FIG. 9 is a side view of an embodiment of a flying saucer.

FIG. 9 depicts an embodiment of a flying saucer, or a VTOL for subsonic applications. This embodiment includes multiple components. The payload compartment cover 91 sits on the payload compartment 92, which is attached to the support frame 93. The drive motors 94 are connected at one end to the support frame 93 and the other end is attached to the lift disc 95. This embodiment includes multiple lift discs that rotate in opposite direction and maintain the stability of the machine in flying mode.

The embodiments of the radial airfoils and lift discs described herein are exemplary and numerous modifications, combinations, variations, and rearrangements can be readily envisioned to achieve an equivalent result, all of which are intended to be embraced within the scope of the appended claims. Further, nothing in the above-provided discussions of the radial airfoils and lift discs should be construed as limiting the invention to a particular embodiment or combination of embodiments. The scope of the invention is defined by the appended claims.

We claim:

1. A radial airfoil configured to connect to a hub and extend radially outward from a rotation axis projecting through the hub, the radial airfoil comprising:
   a thin-walled shell having a proximal cross-section shaped substantially as an airfoil and configured for orientation proximate the hub, and a distal cross-section shaped substantially as an airfoil and radially offset from the proximal cross-section outward from the rotation axis;
   the thin-walled shell including a top surface and a bottom surface each extending between the proximal cross-section and the distal cross-section;
   the top surface and the bottom surface adjoining one another at both a leading edge and a trailing edge, the leading edge and the trailing edge each configured to extend outward from the hub at an angle substantially normal to the rotation axis;
   and wherein, the proximal cross-section is smaller than the distal cross-section.

2. The radial airfoil of claim 1, wherein the proximal cross-section is dimensionally proportional to the distal cross-section.

3. The radial airfoil of claim 2, wherein the proximal cross-section is at least 20% of the size of the distal cross-section.

4. The radial airfoil of claim 1, wherein the top surface is convex.

5. The radial airfoil of claim 1, wherein at least a portion of the bottom surface is concave.

6. The radial airfoil of claim 1, wherein a first angle of attack of the leading edge at the proximal cross-section is different from a second angle of attack of the leading edge at the distal cross-section.

7. A lift disc configured to connect to a propeller drive motor of a VTOL aircraft, the lift disc comprising:
   a hub having a rotation axis and configured for connection to the propeller drive motor;
   a plurality of radial airfoils connected to the hub and extending radially outward from the rotation axis, each radial airfoil comprising:
      a thin-walled shell having a proximal cross-section shaped substantially as an airfoil and orientated proximate the hub, and a distal cross-section shaped substantially as an airfoil and radially offset from the proximal cross-section outward from the rotation axis;

the thin-walled shell including a top surface and a bottom surface each extending between the proximal cross-section and the distal cross-section;

the top surface and the bottom surface adjoining one another at both a leading edge and a trailing edge, the leading edge and the trailing edge each configured to extend outward from the hub at an angle substantially normal to the rotation axis;

and wherein, the proximal cross-section is smaller than the distal cross-section; and a tip ring defining an outer circumference of the lift disc, each radial airfoil connected to the tip ring with the distal cross-section of each radial airfoil oriented toward the tip ring.

8. The lift disc of claim 7, wherein the tip ring forms a contiguous surface with an outer surface of each radial airfoil.

9. The lift disc of claim 7, further including:
an inner ring disposed between the hub and the tip ring and concentric with the tip ring.

10. The lift disc of claim 9, wherein the inner ring forms a contiguous surface with an inner surface of each radial airfoil.

11. A system for enhancing lift of a VTOL aircraft having a propeller drive motor, the system comprising:
a shaft having a rotation axis and configured for connection to the propeller drive motor;
a lift disc connected to the shaft, the lift disc including:
a hub centered about the shaft;
a plurality of radial airfoils connected to the hub and extending radially outward from the rotation axis, each radial airfoil comprising:
a thin-walled shell having a proximal cross-section shaped substantially as an airfoil and orientated proximate the hub, and a distal cross-section shaped substantially as an airfoil and radially offset from the proximal cross-section outward from the rotation axis;

the thin-walled shell including a top surface and a bottom surface each extending between the proximal cross-section and the distal cross-section;

the top surface and the bottom surface adjoining one another at both a leading edge and a trailing edge, the leading edge and the trailing edge each configured to extend outward from the hub at an angle substantially normal to the rotation axis;

and wherein, the proximal cross-section is smaller than the distal cross-section; and a tip ring defining an outer circumference of the lift disc, each radial airfoil connected to the tip ring with the distal cross-section of each radial airfoil oriented toward the tip ring.

12. The system of claim 11, further including:

a propeller rotatably connected to the propeller drive motor and rotatable about the rotation axis of the shaft;

the lift disc fixedly connected to the shaft and disposed downward of the propeller; and, whereby, when the propeller rotates, an induced airflow passes downward over the lift disc, generating additional lift.

13. The system of claim 11, further including:

the lift disc rotatably connected to the propeller drive motor and rotatable about the rotation axis of the shaft.

14. The system of claim 13, further including:

the lift disc having an inner ring disposed between the hub and the tip ring and concentric with the tip ring.

15. The system of claim 11, further including:

wherein a first lift disc is rotatably connected to the propeller drive motor and rotatable about the rotation axis of the shaft; and a second lift disc is fixedly connected to the shaft and disposed downward of the first lift disc; and, whereby, when the first lift disc rotates, an induced airflow passes downward over the second lift disc, generating additional lift.

* * * * *